(12) United States Patent
Jun et al.

(10) Patent No.: US 9,508,493 B2
(45) Date of Patent: Nov. 29, 2016

(54) HYBRID NEGATIVE PLATE FOR LEAD-ACID STORAGE BATTERY AND LEAD-ACID STORAGE BATTERY

(75) Inventors: Furukawa Jun, Fukushima (JP);
Daisuke Momma, Fukushima (JP);
Yosuke Masuda, Fukushima (JP);
Akira Dobashi, Fukushima (JP); Lan Trieu Lam, Springvale (AU); Rosalie Louey, Donvale (AU); Nigel Peter Haigh, Wallan (AU)

(73) Assignees: THE FURUKAWA BATTERY CO., LTD., Yokohama (JP);
COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 487 days.

(21) Appl. No.: 13/392,734

(22) PCT Filed: Aug. 26, 2010

(86) PCT No.: PCT/JP2010/064984
§ 371 (c)(1),
(2), (4) Date: Jun. 19, 2012

(87) PCT Pub. No.: WO2011/025057
PCT Pub. Date: Mar. 3, 2011

(65) Prior Publication Data
US 2012/0258336 A1 Oct. 11, 2012

(30) Foreign Application Priority Data
Aug. 27, 2009 (JP) ................................. 2009-196201

(51) Int. Cl.
*H01M 4/02* (2006.01)
*H01M 4/06* (2006.01)
(Continued)

(52) U.S. Cl.
CPC ............ *H01G 11/34* (2013.01); *H01G 11/24* (2013.01); *H01G 11/38* (2013.01); *H01G 11/42* (2013.01);
(Continued)

(58) Field of Classification Search
USPC .............. 429/209–246, 208; 29/623.1–623.5
See application file for complete search history.

(56) References Cited

U.S. PATENT DOCUMENTS 2,938,063 A 5/1960 Greenburg et al.
3,881,954 A 5/1975 Maskalick
(Continued)

FOREIGN PATENT DOCUMENTS

CN 1357899 7/2002
CN 101079510 11/2007
(Continued)

OTHER PUBLICATIONS

Machine Translation of Satoru et al. (JP 2004-047613, published Feb. 2004, pp. 1-10).*
(Continued)

*Primary Examiner* — Basia Ridley
*Assistant Examiner* — Caitlin Wilmot
(74) *Attorney, Agent, or Firm* — Nixon & Vanderhye P.C.

(57) ABSTRACT

[Problem] To provide a hybrid negative plate for a lead-acid storage battery, that inhibits decrease in hydrogen gas evolution potential and improves rapid discharge cycle characteristics in PSOC.

[Means for Resolution] In a hybrid negative plate for a lead-acid storage battery, comprising a negative electrode active material-filled plate having formed on the surface thereof a coating layer of a carbon mixture comprising a carbon material for ensuring conductivity, activated carbon for ensuring capacitor capacity and/or pseudocapacitor capacity, and at least a binder, activated carbon modified with a functional group is used as the activated carbon. Preferably, activated carbon modified with an acidic surface functional group is used.

7 Claims, 2 Drawing Sheets

(51) Int. Cl.
| | |
|---|---|
| H01M 4/28 | (2006.01) |
| H01M 4/36 | (2006.01) |
| H01G 11/34 | (2013.01) |
| H01G 11/38 | (2013.01) |
| H01G 11/42 | (2013.01) |
| H01M 4/14 | (2006.01) |
| H01M 4/62 | (2006.01) |
| H01G 11/24 | (2013.01) |

(52) U.S. Cl.
 CPC ............... *H01M 4/14* (2013.01); *H01M 4/625* (2013.01); *Y02E 60/126* (2013.01); *Y02E 60/13* (2013.01); *Y02T 10/7022* (2013.01)

(56) References Cited

U.S. PATENT DOCUMENTS

| | | |
|---|---|---|
| 4,215,190 A | 7/1980 | Ferrando et al. |
| 4,422,987 A | 12/1983 | Arimatsu |
| 4,507,372 A | 3/1985 | Rowlette |
| 4,567,284 A | 1/1986 | Monzyk et al. |
| 4,576,879 A | 3/1986 | Nakazawa et al. |
| 4,770,954 A | 9/1988 | Noordenbos |
| 4,882,132 A | 11/1989 | Monzyk et al. |
| 4,975,253 A | 12/1990 | Monzyk et al. |
| 5,069,990 A | 12/1991 | Yoshimura et al. |
| 5,077,151 A | 12/1991 | Yasuda et al. |
| 5,154,989 A | 10/1992 | Howard et al. |
| 5,252,105 A | 10/1993 | Witherspoon et al. |
| 5,260,855 A | 11/1993 | Kaschmitter et al. |
| 5,384,685 A | 1/1995 | Tong et al. |
| 5,393,617 A | 2/1995 | Klein |
| 5,419,977 A | 5/1995 | Weiss et al. |
| 5,429,893 A | 7/1995 | Thomas |
| 5,439,756 A | 8/1995 | Anani et al. |
| 5,455,999 A | 10/1995 | Weiss et al. |
| 5,458,043 A | 10/1995 | Jensen et al. |
| 5,464,453 A | 11/1995 | Tong et al. |
| 5,491,399 A | 2/1996 | Gregory et al. |
| 5,518,833 A | 5/1996 | Repplinger et al. |
| 5,526,223 A | 6/1996 | Wu et al. |
| 5,529,971 A | 6/1996 | Kaschmitter et al. |
| 5,534,369 A | 7/1996 | Nagaura |
| 5,547,783 A | 8/1996 | Funato et al. |
| 5,574,353 A | 11/1996 | Bai et al. |
| 5,587,250 A | 12/1996 | Thomas et al. |
| 5,604,426 A | 2/1997 | Okamura et al. |
| 5,626,729 A | 5/1997 | Thompson et al. |
| 5,670,266 A | 9/1997 | Thomas et al. |
| 5,705,259 A | 1/1998 | Mrotek et al. |
| 5,744,258 A | 4/1998 | Bai et al. |
| 5,781,403 A | 7/1998 | Aoki et al. |
| 5,789,338 A | 8/1998 | Kaschmitter et al. |
| 5,821,006 A | 10/1998 | Patel et al. |
| 5,821,007 A | 10/1998 | Harshe et al. |
| 5,849,426 A | 12/1998 | Thomas et al. |
| 5,916,699 A | 6/1999 | Thomas et al. |
| 5,935,724 A | 8/1999 | Spillman et al. |
| 5,935,728 A | 8/1999 | Spillman et al. |
| 5,960,898 A | 10/1999 | Okada et al. |
| 5,993,983 A | 11/1999 | Rozon |
| 6,005,764 A | 12/1999 | Anderson et al. |
| 6,011,379 A | 1/2000 | Singh et al. |
| 6,072,691 A | 6/2000 | Suhara et al. |
| 6,087,812 A | 7/2000 | Thomas et al. |
| 6,088,217 A | 7/2000 | Patel et al. |
| 6,117,585 A | 9/2000 | Anani et al. |
| 6,190,805 B1 | 2/2001 | Takeuchi et al. |
| 6,195,252 B1 | 2/2001 | Belyakov et al. |
| 6,208,502 B1 | 3/2001 | Hudis et al. |
| 6,208,878 B1 | 3/2001 | Hattori et al. |
| 6,222,723 B1 | 4/2001 | Razoumov et al. |
| 6,252,762 B1 | 6/2001 | Amatucci |
| 6,294,893 B1 | 9/2001 | De Abreu |
| 6,304,467 B1 | 10/2001 | Nebrigic |
| 6,310,789 B1 | 10/2001 | Nebrigic et al. |
| 6,316,563 B2 | 11/2001 | Naijo et al. |
| 6,331,365 B1 | 12/2001 | King |
| 6,333,123 B1 | 12/2001 | Davis et al. |
| 6,466,429 B1 | 10/2002 | Volfkovich et al. |
| 6,509,116 B1 | 1/2003 | Kaneko et al. |
| 6,509,713 B2 | 1/2003 | De Abreu |
| 6,517,972 B1 | 2/2003 | Amatucci |
| 6,541,140 B1 | 4/2003 | Spillman et al. |
| 6,576,365 B1 | 6/2003 | Meitav et al. |
| 6,585,915 B2 | 7/2003 | Shinozaki et al. |
| 6,610,440 B1 | 8/2003 | LaFollette et al. |
| 6,623,884 B1 | 9/2003 | Spillman et al. |
| 6,628,504 B2 | 9/2003 | Volfkovich et al. |
| 6,631,073 B1 | 10/2003 | Sakata et al. |
| 6,643,151 B1 | 11/2003 | Nebrigic et al. |
| 6,646,415 B1 | 11/2003 | Nebrigic et al. |
| 6,653,014 B2 | 11/2003 | Anderson et al. |
| 6,680,600 B2 | 1/2004 | Emori et al. |
| 6,687,116 B2 | 2/2004 | Hudis |
| 6,706,079 B1 | 3/2004 | Shmatko et al. |
| 6,737,822 B2 | 5/2004 | King |
| 6,749,963 B2 | 6/2004 | Kurosaki et al. |
| 6,765,363 B2 | 7/2004 | LaFollette et al. |
| 6,869,731 B2 | 3/2005 | Nobuta et al. |
| 6,887,617 B2 | 5/2005 | Sato et al. |
| 6,911,273 B2 | 6/2005 | Faris |
| 7,006,346 B2 | 2/2006 | Volfkovich et al. |
| 7,035,084 B2 | 4/2006 | Kaneko et al. |
| 7,049,792 B2 | 5/2006 | King |
| 7,057,880 B2 | 6/2006 | Kurosaki et al. |
| 7,074,688 B2 | 7/2006 | Kurihara et al. |
| 7,083,876 B2 | 8/2006 | Honbo et al. |
| 7,110,242 B2 | 9/2006 | Adrianov et al. |
| 7,119,047 B1 | 10/2006 | Adrianov et al. |
| 7,144,654 B2 | 12/2006 | LaFollette et al. |
| 7,166,384 B2 | 1/2007 | LaFollette et al. |
| 7,186,473 B2 | 3/2007 | Shiue et al. |
| 7,358,008 B2 | 4/2008 | Nanno et al. |
| 7,397,650 B2 | 7/2008 | Sato et al. |
| 7,420,295 B2 | 9/2008 | Omae et al. |
| 7,462,419 B2 | 12/2008 | LaFollette et al. |
| 7,468,221 B2 | 12/2008 | LaFollette et al. |
| 7,649,335 B2 | 1/2010 | Ishikawa et al. |
| 7,742,279 B2 | 6/2010 | Takahashi et al. |
| 7,862,931 B2 | 1/2011 | Furukawa et al. |
| 7,923,151 B2 | 4/2011 | Lam et al. |
| 8,017,273 B2 | 9/2011 | Lara-Cruzio et al. |
| 8,057,937 B2 | 11/2011 | Sung et al. |
| 2001/0009734 A1 | 7/2001 | Clough |
| 2001/0011119 A1 | 8/2001 | Naijo et al. |
| 2001/0033501 A1 | 10/2001 | Nebrigic |
| 2001/0044045 A1 | 11/2001 | Sato et al. |
| 2002/0036478 A1 | 3/2002 | De Abreu |
| 2002/0037452 A1 | 3/2002 | Schmidt |
| 2002/0058185 A1 | 5/2002 | Kurosaki et al. |
| 2002/0096661 A1 | 7/2002 | Shinozaki et al. |
| 2002/0132164 A1 | 9/2002 | Kaneko et al. |
| 2002/0155327 A1 | 10/2002 | Faris |
| 2002/0158606 A1 | 10/2002 | King |
| 2002/0161146 A1 | 10/2002 | Naijo et al. |
| 2002/0163771 A1 | 11/2002 | Volfkovich et al. |
| 2002/0176221 A1 | 11/2002 | Hudis |
| 2002/0182485 A1 | 12/2002 | Anderson et al. |
| 2002/0196597 A1 | 12/2002 | Volfkovich et al. |
| 2003/0006737 A1 | 1/2003 | LaFollette et al. |
| 2003/0007317 A1 | 1/2003 | Hudis |
| 2003/0008212 A1 | 1/2003 | Akashi et al. |
| 2003/0011964 A1 | 1/2003 | Hudis |
| 2003/0035982 A1 | 2/2003 | Ryu et al. |
| 2003/0049528 A1 | 3/2003 | Honbo |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |
| 2003/0152815 A1 | 8/2003 | LaFollette et al. |
| 2003/0188901 A1 | 10/2003 | Ovshinsky et al. |
| 2003/0219653 A1 | 11/2003 | Kelley et al. |
| 2003/0232238 A1 | 12/2003 | Fleming et al. |

(56) References Cited

U.S. PATENT DOCUMENTS

| | | |
|---|---|---|
| 2004/0009161 A1 | 1/2004 | Escary |
| 2004/0018421 A1 | 1/2004 | LaFollette et al. |
| 2004/0038087 A1 | 2/2004 | Shiue et al. |
| 2004/0053124 A1 | 3/2004 | LaFollette et al. |
| 2004/0057194 A1 | 3/2004 | Hudis |
| 2004/0091777 A1 | 5/2004 | Lam et al. |
| 2004/0112486 A1 | 6/2004 | Aust et al. |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | LaFollette et al. |
| 2005/0110457 A1 | 5/2005 | LaFollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0221191 A1 | 10/2005 | Kondo et al. |
| 2005/0253458 A1 | 11/2005 | Omae et al. |
| 2005/0260497 A1 | 11/2005 | Kumashiro et al. |
| 2006/0038536 A1 | 2/2006 | LaFollette et al. |
| 2006/0115732 A1 | 6/2006 | Zaghib et al. |
| 2006/0172196 A1 | 8/2006 | Fukunaga |
| 2006/0223701 A1 | 10/2006 | Adrianov et al. |
| 2006/0269801 A1 | 11/2006 | Honbo et al. |
| 2007/0104981 A1 | 5/2007 | Lam et al. |
| 2007/0128472 A1 | 6/2007 | Tierney et al. |
| 2007/0247787 A1 | 10/2007 | Nakagawa et al. |
| 2008/0197810 A1 | 8/2008 | Ishikawa et al. |
| 2008/0199737 A1 | 8/2008 | Kazaryan et al. |
| 2008/0206638 A1 | 8/2008 | Takahashi et al. |
| 2008/0264291 A1 | 10/2008 | Pike et al. |
| 2008/0318135 A1 | 12/2008 | Sung et al. |
| 2009/0059474 A1 | 3/2009 | Zhamu et al. |
| 2009/0272946 A1 | 11/2009 | Lu |
| 2009/0291360 A1 | 11/2009 | Kim et al. |
| 2010/0015531 A1 | 1/2010 | Dickinson et al. |
| 2010/0075210 A1 | 3/2010 | Lee et al. |
| 2010/0175934 A1 | 7/2010 | Lam et al. |
| 2010/0203362 A1 | 8/2010 | Lam et al. |
| 2010/0214722 A1* | 8/2010 | Fujii et al. .................. 361/502 |
| 2011/0151286 A1 | 6/2011 | Lam et al. |
| 2011/0177392 A1 | 7/2011 | Hoshiba |
| 2012/0094174 A1 | 4/2012 | Furukawa et al. |
| 2012/0244429 A1 | 9/2012 | Lam et al. |
| 2012/0263977 A1 | 10/2012 | Furukawa et al. |
| 2014/0127565 A1 | 5/2014 | Furukawa et al. |

FOREIGN PATENT DOCUMENTS

| | | |
|---|---|---|
| CN | 101132065 | 2/2008 |
| CN | 101414691 | 4/2009 |
| EP | 0 354 966 B1 | 1/1989 |
| EP | 0 354 966 A1 | 7/1989 |
| EP | 0 555 422 B1 | 2/1992 |
| EP | 0 662 726 A2 | 12/1994 |
| EP | 0 801 834 B1 | 4/1996 |
| EP | 0 934 607 B1 | 9/1997 |
| EP | 0 964 416 A1 | 11/1997 |
| EP | 0 851 445 A2 | 12/1997 |
| EP | 0 851 445 B1 | 12/1997 |
| EP | 0 872 908 A1 | 4/1998 |
| EP | 0 872 908 B1 | 4/1998 |
| EP | 0 893 790 A2 | 7/1998 |
| EP | 0 893 790 B1 | 7/1998 |
| EP | 1 071 148 B1 | 8/1999 |
| EP | 1 115 130 A1 | 8/1999 |
| EP | 1 000 796 A2 | 11/1999 |
| EP | 1 190 480 B1 | 6/2000 |
| EP | 1 071 148 A2 | 7/2000 |
| EP | 1 126 536 A2 | 2/2001 |
| EP | 1 126 536 B1 | 2/2001 |
| EP | 1 179 871 A2 | 8/2001 |
| EP | 1 189 295 A2 | 9/2001 |
| EP | 1 189 295 B1 | 9/2001 |
| EP | 1 251 576 A2 | 4/2002 |
| EP | 1 315 227 A2 | 4/2002 |
| EP | 1 391 961 A1 | 8/2002 |
| EP | 1 391 961 B1 | 8/2002 |
| EP | 1 309 028 A2 | 10/2002 |
| EP | 1 309 028 B1 | 10/2002 |
| EP | 1 418 428 A1 | 11/2002 |
| EP | 1 496 556 A1 | 4/2003 |
| EP | 1 496 556 B1 | 4/2003 |
| EP | 1 541 422 A1 | 7/2003 |
| EP | 1 775 786 A1 | 7/2003 |
| EP | 1 561 105 B1 | 11/2003 |
| EP | 1 783 792 A1 | 7/2004 |
| EP | 1 386 336 B1 | 1/2006 |
| EP | 2 184 796 A1 | 7/2007 |
| FR | 2 692 077 | 12/1993 |
| JP | S59-105266 | 6/1984 |
| JP | 61-283173 | 12/1986 |
| JP | 62-103976 | 5/1987 |
| JP | 03-129667 | 6/1991 |
| JP | 4061214 | 2/1992 |
| JP | H04-43557 | 2/1992 |
| JP | 4-233170 | 8/1992 |
| JP | 4-294515 | 10/1992 |
| JP | H06-128317 | 5/1994 |
| JP | 09-092272 | 4/1997 |
| JP | H10-021900 | 1/1998 |
| JP | 10-50565 | 2/1998 |
| JP | H10-294135 | 11/1998 |
| JP | H11-097319 | 4/1999 |
| JP | H11-224699 | 8/1999 |
| JP | 2000-1595 | 1/2000 |
| JP | 2000-13915 | 1/2000 |
| JP | 2000-21408 | 1/2000 |
| JP | 2000-077076 | 3/2000 |
| JP | 2000-235858 | 8/2000 |
| JP | 2001-110418 | 4/2001 |
| JP | 2001-126757 | 5/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2002-367613 | 12/2002 |
| JP | 2003-51306 | 2/2003 |
| JP | 2003-77458 | 3/2003 |
| JP | 2003-87988 | 3/2003 |
| JP | 2003-132941 | 5/2003 |
| JP | 2003-200739 | 7/2003 |
| JP | 2003-308696 | 10/2003 |
| JP | 2004-47613 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |
| JP | 2005-50582 | 2/2005 |
| JP | 2005-050582 | 2/2005 |
| JP | 2005-80470 | 3/2005 |
| JP | 2005-160271 | 6/2005 |
| JP | 2005-183632 | 7/2005 |
| JP | 2005-248653 | 9/2005 |
| JP | 2005-294497 | 10/2005 |
| JP | 2005-327489 | 11/2005 |
| JP | 2005-353652 | 12/2005 |
| JP | 2006-156002 | 6/2006 |
| JP | 2006-252902 | 9/2006 |

(56) References Cited

FOREIGN PATENT DOCUMENTS

| | | |
|---|---|---|
| JP | 2006-310628 | 11/2006 |
| JP | 2006-325331 | 11/2006 |
| JP | 2007-12596 | 1/2007 |
| JP | 2007-506230 | 3/2007 |
| JP | 2007-226996 | 9/2007 |
| JP | 2007-280803 | 10/2007 |
| JP | 2008-22605 | 1/2008 |
| JP | 2008-47452 | 2/2008 |
| JP | 2008-146898 | 6/2008 |
| JP | 2008-150270 | 7/2008 |
| JP | 2008-171766 | 7/2008 |
| JP | 2009-104827 | 5/2009 |
| JP | 2009-135056 | 6/2009 |
| JP | 2009-219960 | 10/2009 |
| TW | I268005 | 12/2006 |
| WO | WO89/06865 A1 | 7/1989 |
| WO | WO 92/11174 | 7/1992 |
| WO | WO93/05541 A1 | 3/1993 |
| WO | WO93/14511 A1 | 7/1993 |
| WO | WO94/07272 A1 | 3/1994 |
| WO | WO95/21466 | 8/1995 |
| WO | WO95/23437 A1 | 8/1995 |
| WO | WO96/11522 | 4/1996 |
| WO | WO 96/12313 | 4/1996 |
| WO | WO96/17361 | 6/1996 |
| WO | WO96/30959 | 10/1996 |
| WO | WO97/12415 | 4/1997 |
| WO | WO98/08266 | 2/1998 |
| WO | WO98/19357 | 5/1998 |
| WO | WO 98/24100 | 6/1998 |
| WO | WO98/40925 | 9/1998 |
| WO | WO98/40926 A1 | 12/1998 |
| WO | WO98/54816 | 12/1998 |
| WO | WO99/24996 | 5/1999 |
| WO | WO00/02213 | 1/2000 |
| WO | WO00/11688 | 3/2000 |
| WO | WO00/63929 | 10/2000 |
| WO | WO01/01553 A1 | 1/2001 |
| WO | WO01/17054 A1 | 3/2001 |
| WO | WO01/41232 A2 | 6/2001 |
| WO | WO01/95410 A1 | 12/2001 |
| WO | WO02/01655 A2 | 1/2002 |
| WO | WO02/052664 A2 | 7/2002 |
| WO | WO02/087006 | 10/2002 |
| WO | WO02/091412 A1 | 11/2002 |
| WO | WO02/099956 A2 | 12/2002 |
| WO | WO03/036670 A2 | 5/2003 |
| WO | WO03/055791 A2 | 7/2003 |
| WO | WO 03/077333 | 9/2003 |
| WO | WO03/088385 A1 | 10/2003 |
| WO | WO03/094184 A1 | 11/2003 |
| WO | WO03/098648 A1 | 11/2003 |
| WO | WO2004/008560 A2 | 1/2004 |
| WO | WO2004/012964 A1 | 2/2004 |
| WO | WO2004/038051 A1 | 5/2004 |
| WO | WO2004/042394 A2 | 5/2004 |
| WO | WO2005/027255 A1 | 3/2005 |
| WO | WO2005/041343 A1 | 5/2005 |
| WO | WO2006/006218 A1 | 1/2006 |
| WO | WO2006/062349 A1 | 6/2006 |
| WO | WO 2006/109909 | 10/2006 |
| WO | WO2006/132052 A2 | 12/2006 |
| WO | WO 2007/017506 | 2/2007 |
| WO | WO 2007/034873 | 3/2007 |
| WO | WO 2007/050466 | 5/2007 |
| WO | WO2007/058421 A1 | 5/2007 |
| WO | WO 2007/097534 | 8/2007 |
| WO | WO2008/016236 A1 | 2/2008 |
| WO | WO 2008/051885 | 5/2008 |
| WO | WO 2008/070914 | 6/2008 |
| WO | WO2008/101190 A1 | 8/2008 |
| WO | WO 2008/113133 | 9/2008 |
| WO | WO 2009/013796 | 1/2009 |
| WO | WO 2009/041180 | 4/2009 |
| WO | WO 2009/071292 | 6/2009 |
| WO | WO 2009/005170 | 8/2009 |
| WO | WO 2009/094931 | 8/2009 |
| WO | WO 2009/101047 | 8/2009 |
| WO | WO 2009/128482 | 10/2009 |
| WO | WO 2010/122873 A1 | 10/2010 |

OTHER PUBLICATIONS

English translation of JP Office Action in 2009-540546 mailed Nov. 8, 2013.
Lam, LT et al., "Development of ultra-battery for hybrid-electric vehicle applications", Journal of Power Sources 158 (2006) 1140-1148.
U.S. Appl. No. 13/996,934, Furukawa et al., filed Jun. 21, 2013.
International Search Report for PCT/JP2010/064984 mailed Nov. 22, 2010.
Office Action issued in U.S. Appl. No. 12/531,956 dated Nov. 6, 2014.
Examiner's Report No. 2 on Australian Patent Appln. No. 2004273104 dated Sep. 21, 2009.
International Search Report for PCT/AU2004/001262, mailed Nov. 8, 2004.
International Search Report for PCT/AU2007/001916, mailed Feb. 21, 2008.
International Search Report for PCT/AU2008/000405, mailed May 20, 2008.
International Search Report for PCT/JP2010/055479, mailed Jun. 22, 2010.
International Search Report for PCT/AU2010/001113, mailed Oct. 27, 2010.
International Search Report for PCT/JP2010064985, mailed Nov. 30, 2010.
International Search Report for PCT/AU2011/001647, mailed Mar. 23, 2012.
Derwent Abstract Accession No. 2006-643026/67 & JP 2006-252902 (Kawasaki Heavy Ind Ltd.), Sep. 21, 2006 (2 pages).
Derwent Abstract Accession No. 2006-003619/01 & JP 2005-327489 (Matsuhita Denki Sangyo KK.), Nov. 24, 2005 (2 pages).
Derwent Abstract Accession No. 2006-036969/05 & JP 2006-310628 (Nippon Zeon KK), Nov. 9, 2006 (2 pages).
Derwent Abstract Accession No. 2006-110075/11, Osaka Gas Co Ltd., (Jan. 19, 2006), 2 pages.
Derwent Abstract Accession No. 2004-683934/67, Mitsubishi Chem Corp., (Sep. 30, 2004), 2 pages.
Derwent Abstract Accession No. 2004-395525/37, Shin Kobe Electric Machinery., (Apr. 30, 2004), 2 pages.
Derwent Abstract Accession No. 2005-135458/15, TDK Corp., (Jan. 27, 2005), 2 pages.
Office Action issued in U.S. Appl. No. 12/518,521 dated Oct. 25, 2012.
Office Action issued in U.S. Appl. No. 12/518,521 dated Jan. 17, 2013.
Office Action issued in U.S. Appl. No. 12/518,521 dated Nov. 6, 2013.
Office Action issued in U.S. Appl. No. 12/518,521 dated Jun. 9, 2014.
Office Action issued in U.S. Appl. No. 12/518,521 dated Mar. 10, 2015.
Office Action issued in U.S. Appl. No. 12/531,956 dated Feb. 21, 2012.
Office Action issued in U.S. Appl. No. 12/531,956 dated Aug. 1, 2012.
Office Action issued in U.S. Appl. No. 12/531,956 dated May 9, 2013.
Office Action issued in U.S. Appl. No. 12/531,956 dated Nov. 22, 2013.
Office Action issued in U.S. Appl. No. 12/531,956 dated Apr. 17, 2014.
Office Action issued in U.S. Appl. No. 13/265,944 dated Dec. 24, 2014.
Office Action issued in U.S. Appl. No. 13/265,944 dated Apr. 9, 2015.

(56) References Cited

OTHER PUBLICATIONS

Office Action issued in U.S. Appl. No. 13/392,651 dated Jan. 17, 2013.
Office Action issued in U.S. Appl. No. 13/392,651 dated Oct. 25, 2013.
Office Action issued in U.S. Appl. No. 13/392,651 dated Jun. 18, 2014.
Office Action issued in U.S. Appl. No. 13/392,651 dated Dec. 9, 2014.
Office Action issued in U.S. Appl. No. 13/392,651 dated Apr. 6, 2015.
Office Action issued in U.S. Appl. No. 13/392,774 dated Sep. 30, 2014.
Office Action issued in U.S. Appl. No. 13/392,774 dated May 21, 2015.
Office Action issued in U.S. Appl. No. 13/265,944 dated Oct. 27, 2015.
Office Action issued in U.S. Appl. No. 13/996,934 dated Dec. 24, 2015.
Office Action issued in U.S. Appl. No. 13/392,651 dated Oct. 13, 2015.
Action issued in U.S. Appl. No. 13/392,651 dated Mar. 23, 2016.
Office Action issued in U.S. Appl. No. 12/531,956 dated Jul. 28, 2015.
Russian Patent Application No. 2012111222—Office Action (English translation included), mailed Aug. 27, 2014.
Russian Patent Application No. 2012111683—Office Action (English translation included), mailed Sep. 3, 2014.
Chinese Patent Application No. 201080047297.07—First Notification of Office Action (English translation included), mailed Apr. 3, 2014.
European Patent Application No. 10814794.3—Search Report, mailed Dec. 2, 2013.
Japanese Patent Application No. 2012-52822—Office Action (English translation included), mailed Apr. 22, 2014.

* cited by examiner

X-axis: CYCLE LIFE (NUMBER)
Y-axis: AMOUNT OF ACIDIC SURFACE FUNCTIONAL GROUP ($\mu$ mol/m$^2$)

$y=-843.06x^2+2754.6x+91.458$
$R^2=0.9415$

X-axis: CYCLE LIFE (NUMBER)
Y-axis: AMOUNT OF CARBOXYL ($\mu$ mol/m$^2$)

$y=11469x+606.11$
$R^2=0.9068$

X-axis: CYCLE LIFE (NUMBER)
Y-axis: AMOUNT OF LACTONE (μ mol/m²)

X-axis: CYCLE LIFE (NUMBER)
Y-axis: AMOUNT OF PHENOLIC HYDROXYL (μ mol/m²)

HYBRID NEGATIVE PLATE FOR LEAD-ACID STORAGE BATTERY AND LEAD-ACID STORAGE BATTERY

This application is the U.S. national phase of International Application No. PCT/JP2010/064984 filed 26 Aug. 2010 which designated the U.S. and claims priority to JP 2009-196201 filed 27 Aug. 2009, the entire contents of each of which are hereby incorporated by reference.

TECHNICAL FIELD

The present invention relates to a hybrid negative plate for a lead-acid storage battery suitable for hybrid automobile applications repeating rapid charge and discharge in PSOC and industrial applications such as windmills and PV (photovoltaics), and a lead-acid storage battery.

BACKGROUND ART

JP-T-2007-506230 (the term "JP-T" as used herein means a published Japanese translation of a PCT patent application) proposes an invention that by using a hybrid negative plate comprising a negative plate comprising a porous collecting plate and a lead active material filled therein, and having formed on the surface thereof, a coating layer of a carbon mixture comprising two kinds of carbon materials comprising a first carbon material such as conductive carbon black, and a second carbon material such as activated carbon or graphite, having capacitor capacity and/or pseudocapacitor capacity, and a binder, as a negative electrode of a lead-acid storage battery, in the case of repeating rapid charge and discharge in PSOC of a lead-acid storage battery, life can greatly be prolonged by the function of the capacitor as compared with a lead-acid storage battery equipped with the conventional negative plate.

PRIOR ART REFERENCES

Patent Reference

[Patent Reference 1] JP-T-2007-506230

SUMMARY OF THE INVENTION

Problems that the Invention is to Solve

However, it became clear in the lead-acid storage battery that because an amount of hydrogen gas evolved from a negative electrode during charging is determined by hydrogen overvoltage of the negative electrode, formation of a coating layer of the above-described carbon mixture having a large surface area and low hydrogen overvoltage on the surface of a negative electrode active material-filled plate as described in Patent Document 1 above promotes hydrogen gas evolution, leading to decrease in an electrolyte due to water electrolysis during charging. To inhibit this phenomenon, Patent Document 1 discloses increasing hydrogen overvoltage by mixing additives such as lead, zinc, bismuth, silver and their compounds to the carbon mixture. Hydrogen overvoltage of a negative electrode can be increased by the addition of those additives, but the increased hydrogen voltage is not yet sufficient. As a result of investigations, it was found that particularly when activated carbon is used as a second carbon material, hydrogen overvoltage cannot be increased, and properties of the activated carbon itself greatly affect the presence or absence of appearance of the effect of increasing hydrogen overvoltage.

The present invention has been made based on the finding. The present invention has an object to overcome the problems in the above-described conventional invention, and to provide a hybrid negative plate for a lead-acid storage battery, that inhibits decrease in hydrogen overvoltage and additionally inhibit water reduction by increasing hydrogen overvoltage, based on the improvement of activated carbon, leading to improvement in cycle characteristics of a lead-acid storage battery, and a lead-acid storage battery using the hybrid negative plate.

Means for Solving the Problem

The present invention, in an aspect, may provide a hybrid negative plate for a lead-acid storage battery, comprising a negative electrode active material-filled plate having formed on the surface thereof a coating layer of a carbon mixture comprising a carbon material for ensuring conductivity, activated carbon for ensuring capacitor capacity and/or pseudocapacitor capacity, and at least a binder, wherein the activated carbon is activated carbon modified with a functional group.

The present invention, in any aspect, may provide the hybrid negative plate for a lead-acid storage battery, wherein the activated carbon modified with a functional group contains a volatile component in an amount of 3 to 30% by weight.

The present invention, in an aspect, may provide the hybrid negative plate for a lead-acid storage battery, wherein the carbon mixture comprises 5 to 70 parts by weight of the carbon material, 20 to 80 parts by weight of the activated carbon, 1 to 20 parts by weight of the binder, 0 to 10 parts by weight of a thickener, and 0 to 10 parts by weight of a short fiber-like reinforcement.

The present invention, in an aspect, may provide the hybrid negative plate for a lead-acid storage battery wherein an amount of the carbon mixture applied to the surface of the negative electrode active material-filled plate is 15 parts by weight or less relative to 100 parts by weight of the negative electrode active material.

The present invention, in an aspect, may provide the hybrid negative plate for a lead-acid storage battery, wherein the carbon mixture coating layer has a porosity of 40 to 90%.

The present invention, in an aspect, may provide the hybrid negative plate for a lead-acid storage battery, wherein the carbon mixture coating layer has a thickness of 0.1 mm or less.

The present invention, in an aspect, may provide a lead-acid storage battery comprising the hybrid negative plate.

The present invention, in an aspect, may provide the hybrid negative plate for a lead-acid storage battery, wherein the activated carbon modified with a functional group is an acidic surface functional group.

The present invention, in any aspect, may provide the hybrid negative plate for a lead-acid storage battery, wherein an amount of the acidic surface functional group is that a value obtained by dividing the amount thereof per 1 g of the activated carbon by a specific surface area of the activated carbon is 0.16 to 3.11 $\mu mol/m^2$.

The present invention, in an aspect, may provide the hybrid negative plate for a lead-acid storage battery, wherein the acidic surface functional group is a carboxyl group, and an amount of the carboxyl group per 1 g of the activated carbon is that a value divided by a specific surface area of the activated carbon is 0.01 $\mu mol/m^2$ or more.

The present invention, in an aspect, may provide the hybrid negative plate for a lead-acid storage battery, wherein the acidic surface functional group is a lactone group, and an amount of the lactone group per 1 g of the activated carbon is that a value divided by a specific surface area of the activated carbon is 0.04 μmol/m² or more.

The present invention, in an aspect, may provide the hybrid negative plate for a lead-acid storage battery, wherein the acidic surface functional group is a phenolic hydroxyl group, and an amount of the phenolic hydroxyl group per 1 g of the activated carbon is that a value divided by a specific surface area of the activated carbon is 0.14 μmol/m² or more.

The present invention, in an aspect, may provide a lead-acid storage battery, comprising the hybrid negative plate.

Effect of the Invention

In an aspect, the lead-acid storage battery comprising the hybrid negative plate can inhibit decrease in hydrogen overvoltage, leading to, for example, improvement of rapid charge and discharge cycle characteristics in PSOC. Thus, the lead-acid storage battery is suitable for use in hybrid automobiles repeating on/off action of an engine and industries utilizing various batteries, such as windmills, and brings about excellent effect.

In an aspect, the invention can increase hydrogen overvoltage of the negative electrode, and additionally, can decrease internal resistance. The invention further inhibits precipitation of lead. Thus, the invention provides a lead-acid storage battery having excellent battery characteristics.

In an aspect, the invention can secure good conductivity and capacitor capacity of the negative electrode by that the amount of the first carbon material is 5 to 70 parts by weight.

In an aspect, the invention can secure capacitor capacity by that the amount of the activated carbon modified with a functional group is 20 to 80 parts by weight.

In an aspect, the invention can secure electrical connection between the carbon mixture coating layer and the surface of the negative electrode active material-filled plate, and conductivity, and further can maintain the carbon mixture coating layer in a good porous state by that the amount of binder is 1 to 20 parts by weight.

In an aspect the amounts of the thickener and the short fiber-like reinforcement are 10 parts by weight or less, respectively, and the amount is effective to prepare the carbon mixture in a paste state without deterioration of conductivity. Furthermore, the short fiber-like reinforcement can prevent cracks of the carbon mixture coating layer during drying.

In an aspect, the invention can surely form the carbon mixture coating layer having an appropriate thickness, leading to the above effect.

In an aspect, the invention can secure movement of an electrolyte and therefore can secure good discharge performance, by that the carbon mixture coating layer has a porosity of 60 to 90%.

In an aspect, the invention brings about economically sufficient discharge effect by that the carbon mixture coating layer has a thickness of 1.0 mm or less.

According to an aspect of the invention, the lead-acid storage battery can be used in hybrid automobiles repeating on-of operations of an engine, and various industries utilizing a battery, such as windmills, thereby rapid charge and discharge cycle characteristics can be improved.

In certain aspects, the inventions increase electrostatic capacity of the hybrid negative plate. The lead-acid storage battery comprising each of those hybrid negative plates, improves charge acceptability, and this leads to improvement of cycle characteristics. Furthermore, hydrogen overvoltage of the hybrid negative plate is increased, and water reduction is inhibited, leading to improvement of cycle characteristics.

MODE FOR CARRYING OUT THE INVENTION

Figure 1:
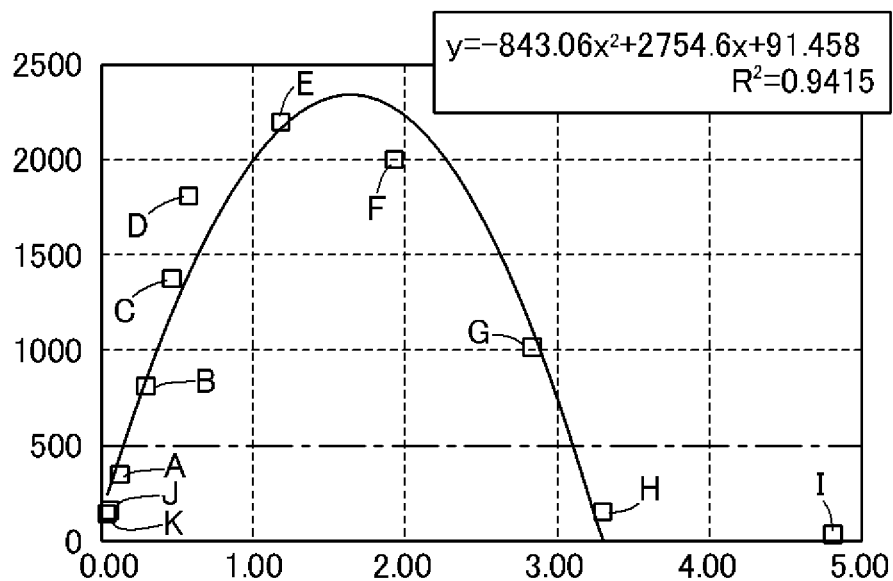
FIG. 1 is a view showing the relationship between an amount of an acidic surface functional group per unit area of activated carbon and cycle life.

The embodiment of the present invention is described in detail below.

When activated carbon selected as a second carbon material to be mixed with the first carbon material is generally used as activated carbon for an electric double layer capacitor, the activated carbon is subjected to a treatment for removing a surface functional group thereof by, for example, high temperature treatment in order to improve durability of the activated carbon. The reason for this is that when an organic electrolyte is used, a surface functional group of activated carbon brings in moisture to a system, and the moisture remarkably deteriorates durability. It is further said that in an aqueous capacitor, the moisture causes a metal material used in a substrate to corrode and elute, and the resulting impurity ions deteriorate durability.

However, the present inventors have found that a surface functional group of activated carbon, that has conventionally been considered unnecessary to be present, plays a critical role in increasing hydrogen overvoltage.

More specifically, a carbon mixture comprising carbon black for ensuring conductivity as a first carbon material, the conventional activated carbon, PP as a binder, and water as a dispersant was applied to the surface of a negative plate of a lead-acid storage battery, that is, a lead active material-filled plate, followed by drying. Thus, a hybrid negative electrode having formed thereon a porous carbon mixture coating layer was prepared. The hybrid negative electrode thus prepared was used as a negative electrode of a lead-acid storage battery, and charge and discharge were repeated. In the course of charge-discharge repetition, it was expected that lead ions dissolved from the hybrid negative electrode gradually precipitate on the surface of the porous carbon mixture coating layer to form layers of metallic lead and/or lead sulfate, and as a result, hydrogen overvoltage of the negative electrode is increased to a level of a negative electrode free of a carbon mixture coating layer.

However, the fact was that when the amount of a surface functional group of activated carbon is small, lead ions do not sufficiently precipitate, and even though charge and discharge are repeated, hydrogen overvoltage is not increased. In view of this fact, by way of experiment, each of activated carbons in which the amount of a surface functional group had gradually been increased was contained in a carbon mixture, many negative electrodes were prepared in the same manner as above, lead-acid storage batteries having the respective negative electrodes therein were produced, and the state of the negative electrodes after repeating charge and discharge was examined, respectively. As a result, it was confirmed that metallic lead and/or lead sulfate layers are sufficiently formed on the surface of the carbon mixture coating layer, and hydrogen overvoltage of the respective negative electrodes is increased.

As a result of further experimentations and researches from the above standpoint, the conclusion was obtained that the amount of a surface functional group of activated carbon brings about the effect of increasing hydrogen overvoltage in an amount of a specific range described below. Consequently, the conventional activated carbon is considered as activated carbon that is not modified with a surface functional group, and activated carbon characterized in the present invention, is expressed as "activated carbon modified with a functional group" and is distinguished from the conventional activated carbon.

Conventionally, it is considered that the amount of a surface functional group can be quantitatively determined by XSP (X-ray photoelectron spectroscopy) and a titration method for a specific functional group, but the quantitative determination requires high technique and is generally difficult to perform. As a result of intensive investigations in view of the circumstance, the present inventors have given thought to use a quantitative value of a volatile component defined in JIS M 8812 as an alternative characteristic. Porous carbon mixture coating layers containing various activated carbons having different amount of a functional group were formed on negative electrodes, respectively, and hydrogen overvoltage of the respective negative electrodes was measured by cyclic voltammogram. As a result, when activated carbon contains a volatile component in an amount of 3% by weight or more, hydrogen overvoltage is increased, but when the amount of the volatile component is increased and exceeds 30% by weight, capacitor capacity is decreased. It has been clarified from this fact that the amount of the volatile component is preferably in a range of from 3 to 30% by weight, and more preferably from 4 to 25% by weight, and durability is not deteriorated.

The preferred carbon mixture of the present invention has a composition comprising 5 to 70 parts by weight of the first carbon material, 20 to 80 parts by weight of the activated carbon, 1 to 10 parts by weight of the binder, 1 to 10 parts by weight of the thickener, and 0 to 10 parts by weight of the short fiber-like reinforcement.

The first carbon material is necessary to ensure conductivity, and suitable examples of the first carbon material include carbon black such as acetylene black and furnace black, Ketjen black and graphite. From the standpoint of emphasis on conductivity, the carbon material preferably contains a small amount of the surface functional group. Where the amount of the first carbon material added is less than 5 parts by weight, conductivity cannot be ensured, leading to decrease in capacitor capacity. On the other hand, the amount exceeds 70 parts by weight, conductive effect is saturated. The amount of the first carbon material is more preferably 10 to 60 parts by weight.

The activated carbon is necessary to ensure capacity as capacitor and/or pseudocapacitor. From the standpoint of ensuring capacitor and/or pseudocapacitor capacities, where the amount of the activated carbon added is less than 20 parts by weight, capacitor capacity is insufficient, and on the other hand, where the amount thereof exceeds 80 parts by weight, the proportion of the first carbon material is relatively decreased, and capacity is rather decreased. The amount of the activated carbon is more preferably 30 to 70 parts by weight.

The binder is necessary to bond carbon materials to each other and bond the carbon materials to a surface of the negative electrode constituting a lead-acid storage battery to thereby ensure electrical connection, and additionally, to maintain the mixture in a porous state. Suitable examples of the binder include polychloroprene, SBR, PTFE and PVDF. Where the amount of the binder is less than 1 part by weight, the bonding is insufficient, and on the other hand, where the amount thereof exceeds 20 parts by weight, the bonding effect becomes saturated, and further because the binder is an insulating material, the binder decreases conductivity. The amount of the binder is more preferably 5 to 15 parts by weight.

The thickener is useful to prepare a paste-like mixture. Suitable examples of an aqueous paste include cellulose derivatives such as CMC and MC, polyacrylate and polyvinyl alcohol, and suitable examples of an organic paste include NMP (N-methyl-2-pyrrolidone) and 1-methyl-2-pyrrolidone. In the case of using the thickener, when dry residue exceeds 10 parts by weight, conductivity of the mixture is deteriorated. Therefore, the amount of the thickener should not exceed 10 parts by weight.

The short fiber-like reinforcement is effective to inhibit occurrence of cracks due to drying when the mixture is prepared into a paste and the paste is applied to a negative electrode. A material of the reinforcement is required to be stable in sulfuric acid acidity, and examples thereof include carbon, glass, PET (polyethylene terephthalate) and polyester. The reinforcement desirably has a size of 20 μm or less and a length of 0.1 mm to 4 mm. Where the amount of the reinforcement added exceeds 10 parts by weight, the amount decreases relative ratios of the carbon material and the binder, resulting in deterioration of performance, and further decreases conductivity. Therefore, the amount of the reinforcement should not exceed 10 parts by weight.

The amount of the carbon mixture added is preferably 15 parts by weight or less relative to 100 parts by weight of the negative electrode active material. Where the amount of the carbon mixture exceeds 15 parts by weight, thickness of the coating layer is increased and the effect becomes saturated. The amount of the carbon mixture is more preferably 3 to 10 parts by weight.

The porous carbon mixture coating layer covering the negative electrode active material-filled plate has a porosity of preferably 40 to 90%. Where the porosity is less than 40%, movement of an electrolyte is inhibited, leading to decrease in discharge performance. On the other hand, where the porosity exceeds 90%, the effect becomes saturated, and additionally, a thickness of the coating layer is increased, resulting in designing trouble. The porosity is more preferably 60 to 80%.

The carbon mixture coating layer has a thickness of 1.0 mm or less. Even where the thickness exceeds 1.0 mm, the discharge characteristic effect becomes saturated, and further improvement is not achieved. For this reason, the thickness of 1.0 mm or less brings about the above effect with economy.

Comparative Test Example 1

Respective hydrogen gas evolution potentials of six kinds of activated carbons each containing a volatile component in a different amount of 2.5%, 3.0%, 3.2%, 4.1%, 4.8% and 5.3% by weight were examined in the following manner.

The six kinds the activated carbons were used as compounding ingredients of the carbon mixture shown in Table 1 below, and six kinds of the carbon mixtures were prepared as Sample Nos. 1 to 6. Each of the six kinds of the carbon mixture samples was applied to both surfaces of a 2 cm square pure lead plate in the total amount of 0.5 g. The plate was sandwiched between AGM (Absorbed Glass Mat) separators, and counter electrodes comprising lead dioxide were stacked on the both sides to prepare a stack (laminate). The stack was sandwiched between acrylic plates, and fixed such that a pressure of 20 kPa is applied thereto. The stack was placed in a sulfuric acid aqueous solution having specific gravity of 1.30 and a temperature of 25° C., charge and discharge by cyclic voltammogram were repeated 10 times at a scan rate of 10 mV/sec in a range of −1.6V to +1.0V vs. $Hg/Hg_2SO_4$, and cathode potential due to hydrogen evolution initiation at 10th cycle was measured. The results are shown in Table 2 below.

On the other hand, for the sake of comparison, a 2 cm square pure lead plate to which a carbon mixture is not applied was used as a comparative sample. The comparative sample was sandwiched between an AGM separator and lead dioxide to prepare a stack, and the resulting stack was sandwiched between acrylic plates, and fixed such that a pressure of 20 kPa is applied thereto. Charge and discharge were repeated 10 times under the same conditions as above, and cathode potential due to hydrogen evolution at 10th cycle was measured. The results are shown in Table 2. It was clarified from Table 2 that hydrogen gas evolution potential is increased with increasing the amount of the volatile component in activated carbon, and when the amount of the volatile component is 3.0% by weight or more, problem-free hydrogen gas evolution potential as a lead-acid storage battery is obtained.

In Table 1, Table 2, and Table 3 described hereinafter, the activated carbon modified with a functional group was simply indicated as activated carbon.

TABLE 1

Formulation composition of carbon mixture

| Materials | Mixed Amount (parts by weight) |
|---|---|
| First carbon material: Furnace black | 45 parts by weight |
| Activated carbon | 40 parts by weight |
| Binder: Polychloroprene | 10 parts by weight |
| Thickener: CMC | 4 parts by weight |
| Short fiber-like reinforcement: Tetron | 5 parts by weight |
| Dispersion medium: Ion-exchanged water | 280 parts by weight |

TABLE 2

| Kind of activated carbon | Working electrode | Amount of volatile component of activated carbon (wt. %) | Hydrogen evolution initiation potential (V vs. $Hg/Hg_2SO_4$) |
|---|---|---|---|
| Sample No. 1 | Pure lead plate | 2.5 | −1.36 |
| Sample No. 2 | Pure lead plate | 3.0 | −1.43 |
| Sample No. 3 | Pure lead plate | 3.2 | −1.47 |
| Sample No. 4 | Pure lead plate | 4.1 | −1.49 |
| Sample No. 5 | Pure lead plate | 4.8 | −1.50 |
| Sample No. 6 | Pure lead plate | 5.3 | −1.51 |
| Comparative sample | Pure lead plate | — | −1.52 |

Comparative Test Example 2

The conventional formed positive plate and formed negative plate used in a valve-regulated lead-acid storage battery were prepared by the conventional method. Each of six kinds of carbon mixtures comprising the common formulation composition shown in Table 1 and each of six kinds of activated carbons each containing a volatile component in a different amount of 2.5%, 3.0%, 3.2%, 4.1%, 4.8% and 5.3% by weight was applied to both surfaces of each of the formed negative plates thus produced, followed by drying at 60° C. for 1 hour in the air. Thus, six kinds of hybrid negative plates having a porous carbon mixture coating layer having a porosity of 75% were produced.

Each of the six kinds of the hybrid negative plates produced above was used as a negative electrode. The negative plate was laminated with the positive electrode and AMG separator to assemble a plate group, and the plate group was put in a battery case of a valve-regulated lead-acid storage battery in the same manner as in the conventional assembling method. Thus, six kinds of lead-acid storage batteries having 5-hour rate capacity of 10 Ah in capacity control of positive electrode were assembled. Degree of compression of the plate group was adjusted by inserting a spacer between the battery case and the plate group as to be 50 kPa.

For the sake of comparison, a negative electrode active material-filled plate comprising a filling porous collecting substrate to which a carbon mixture is not applied, and a lead active material filled therein was used as a negative electrode, and a plate group was prepared in the same manner as above. The plate group was put in a battery case such that the degree of compression is 50 kPa. Thus, the conventional 2V lead-acid storage battery having 5-hour rate capacity of 10 Ah was assembled.

A sulfuric acid aqueous solution having specific gravity of 1.30 prepared by dissolving 30 g/liter of aluminum sulfate octadeca hydrate in water was poured as an electrolyte in each of the six kinds of the lead-acid storage battery Nos. 1 to 6 assembled above and the above lead-acid storage battery for comparison. Those batteries were charged at 1 A for 20 hours, and then discharged at 2 A until battery voltage reaches 1.75V. The batteries were again charged at 1 A for 15 hours and then discharged at 2 A until a cell voltage of 1.75V, and 5-hour rate capacity of the batteries was measured. As a result, the capacity of all of those batteries was 10 Ah.

Life Test

Each of the six kinds of the lead-acid storage battery Nos. 1 to 6 above and the conventional lead-acid storage battery above were subjected to a life test by repeating rapid charge and discharge in PSOC in the form of the simulation of running by HEV. Specifically, the testis as follows. Each lead-acid storage battery was discharged at 2 A for 1 hour to make 80% of PSOC. Discharging at 50 A for 1 second and charging at 20 A for 1 second were repeated 500 times in the atmosphere of 40° C., and charging at 30 A for 1 second and pausing for 1 second were repeated 510 times. Those operations were taken as one cycle. This test was repeated 400 cycles, and internal resistance of the lead-acid storage battery was measured. The results are shown in Table 3. The conventional lead-acid storage battery came to the end of its life in 180 cycles, and the internal resistance thereof could not be measured. As is apparent from Table 3, it has been seen that the internal resistance is decreased and the battery performance is improved, with increasing the amount of a volatile component of the activated carbon.

TABLE 3

| Kind of battery | Amount of volatile component of activated carbon (wt. %) | Internal resistance at 400th cycle (mΩ) |
| --- | --- | --- |
| Battery No. 1 | 2.5 | 3.2 |
| Battery No. 2 | 3.0 | 2.5 |
| Battery No. 3 | 3.2 | 2.3 |
| Battery No. 4 | 4.1 | 2.0 |
| Battery No. 5 | 4.8 | 1.8 |
| Battery No. 6 | 5.3 | 1.7 |
| Conventional battery | — | Unmeasurable |

Comparative Test Example 3

Each of carbon mixtures having the formation composition shown in Table 1 was prepared using each of seven kinds of activated carbons containing a volatile component in a different amount of from 3.0% by weight to 36.2% by weight as shown in Table 4 below. Each of the seven kinds of the carbon mixtures was applied to both surfaces of a 2 cm square pure lead plate in the total amount of 0.5 g in the same manner as in Example 2. The plate was sandwiched between AGM separators, and counter electrodes comprising lead dioxide were provided on the both sides to prepare a stack. The stack was sandwiched between acrylic plates, and fixed such that a pressure of 20 kPa is applied thereto. Each of seven kinds of stack (negative electrode) sample Nos. 7 to 13 was placed in a sulfuric acid aqueous solution having specific gravity of 1.30 and a temperature of 25° C., charge and discharge by cyclic voltammogram were repeated 10 times at a scan rate of 10 mV/sec in a range of −1.6V to +1.0V vs. $Hg/Hg_2SO_4$, and cathode potential due to hydrogen evolution initiation at 10th cycle was measured. Furthermore, coulomb amount at the 10th cycle in a range of (−0.7V to +0.65V vs. $Hg/Hg_2SO_4$) having no influence of redox capacity of the pure lead plate and current to gas evolution was obtained.

For the sake of comparison, a stack (negative electrode) comprising a pure lead plate to which a carbon mixture is not applied, and a separator and a counter electrode comprising lead dioxide, sequentially laminated on both sides of the pure lead plate was used as a comparative sample. The stack was sandwiched between acrylic plates, and fixed such that a pressure of 20 kPa is applied thereto. Charge and discharge were repeated 10 times under the same conditions as above, and cathode potential due to hydrogen evolution initiation at 10th cycle and coulomb amount in a range of −0.7V to +0.65V were obtained. The results are shown in Table 4.

As is apparent from Table 4, when the amount of a volatile component of activated carbon is 36.2% by weight, exceeding 30% by weight, hydrogen overvoltage moves into a noble side, and additionally, the coulomb amount is decreased.

As is apparent from Comparative Test Examples 1 to 3, when activated carbon modified with a functional group, containing a volatile component in a range of 3 to 30% by weight is compounded with a carbon mixture, the resulting carbon mixture is applied to a surface of a negative plate comprising a lead active material-filled plate, and a negative electrode having the carbon mixture coating layer formed thereon is used in a lead-acid storage battery, increase in hydrogen gas evolution is inhibited, battery life is prolonged, and rapid discharge cycle characteristics in PSCO are excellent. Furthermore, use of the negative electrode in industrial fields utilizing a battery, such as hybrid automobiles and windmills, brings about improvement of negative electrode polarity.

Comparative Test Example 4

The present inventors have further found that in an active material modified with a functional group, specific kind and amount of a surface functional group of activated carbon plays an important role in improving cycle life of a lead-acid storage battery. Samples A to K shown in Table 5 below were prepared by the following methods.
Preparation of Various Activated Carbons:
1) Coconut shell activated carbon obtained by subjecting coconut shell type activated carbon to steam activation for 2 hours was used as Sample A.
2) Air oxidation method
The activated carbon of Sample A was surface-treated with an air oxidation method. Specifically, the activated carbon was heated to 350° C. in wet air stream (1 liter/min), and held at the temperature for 1 hour, 3 hours or 5 hours, followed by cooling to room temperature. The activated carbons thus prepared were used as Samples B, C and D, respectively.
3) Solution oxidation method
The activated carbon of Sample A was surface-treated with a solution oxidation method. Specifically, the activated carbon was dipped in an ammonium persulfate aqueous solution having a concentration of 0.3 mol/liter, 1.5 mol/liter, 1.0 mol/liter, 1.2 mol/liter or 2.0 mol/liter, and then allowed to stand for two days and nights, followed by

TABLE 4

| Kind of activated carbon | Working electrode | Amount of volatile component of activated carbon (wt. %) | Hydrogen evolution initiation potential of negative electrode (V vs. $Hg/Hg_2SO_4$) | Coulomb amount (at 10th cycle) −0.7 V to +0.65 V (V vs. $Hg/Hg_2SO_4$) |
| --- | --- | --- | --- | --- |
| Sample No. 7 | Pure lead plate | 3.0 | −1.43 | $271 \times 10^3$ |
| Sample No. 8 | Pure lead plate | 5.6 | −1.52 | $476 \times 10^3$ |
| Sample No. 9 | Pure lead plate | 9.4 | −1.50 | $296 \times 10^3$ |
| Sample No. 10 | Pure lead plate | 16.2 | −1.47 | $328 \times 10^3$ |
| Sample No. 11 | Pure lead plate | 18.9 | −1.49 | $325 \times 10^3$ |
| Sample No. 12 | Pure lead plate | 30.0 | −1.46 | $312 \times 10^3$ |
| Sample No. 13 | Pure lead plate | 36.2 | −1.42 | $194 \times 10^3$ |
| Comparative Sample | Pure lead plate | — | −1.52 | — | washing with water and drying. Those activated carbons thus obtained were used as Samples E, F, G, H and I, respectively.

4) Heat treatment method

The activated carbon of Sample A was surface-treated with a heat treatment method. Specifically, the activated carbon was heated to 800° C. in a nitrogen atmosphere, and then held at the temperature for 1 hour or 2 hours, followed by cooling to room temperature. The activated carbons thus prepared were used as Samples J and K, respectively.

Specifically, 2.0 g of each measurement sample of Samples A to K having been subjected to the pre-treatment was measured with an automatic specific surface area measuring device (JEMINI 2360, manufactured by Shimadzu Corporation), and a specific surface area ($m^2/g$) was calculated from the BET equation. The results are shown in Table 5.

b) Measurement of Average Particle Size

Average particle size of the activated carbons of Samples A to K was measured using a laser diffraction method.

TABLE 5

| Kind of activated carbon | Surface treatment method | Surface treatment Amount of ammonium persulfate (mol/l) | Temperature (° C.) | Time (hr) | Amount of acidic surface functional group (mmol/g) | Specific surface area ($m^2/g$) | Average particle size (μm) |
|---|---|---|---|---|---|---|---|
| Sample A | Non-treatment | — | — | — | 0.195 | 1360 | 10.7 |
| Sample B | Air oxidation | — | 350 | 1 | 0.432 | 1382 | 10.9 |
| Sample C | Air oxidation | — | 350 | 3 | 0.647 | 1387 | 10.8 |
| Sample D | Air oxidation | — | 350 | 5 | 0.810 | 1401 | 10.8 |
| Sample E | Solution oxidation | 0.3 | — | — | 1.535 | 1307 | 9.9 |
| Sample F | Solution oxidation | 0.5 | — | — | 2.528 | 1312 | 9.9 |
| Sample G | Solution oxidation | 1.0 | — | — | 3.713 | 1305 | 10.2 |
| Sample H | Solution oxidation | 1.2 | — | — | 4.321 | 1311 | 10.0 |
| Sample I | Solution oxidation | 2.0 | — | — | 6.246 | 1301 | 9.8 |
| Sample J | Heat treatment | — | 800 | 1 | 0.112 | 1400 | 10.5 |
| Sample K | Heat treatment | — | 800 | 2 | 0.077 | 1434 | 10.5 |

Measurement of Amount of Acidic Surface Functional Group of Activated Carbon:

The amount of the acidic surface functional group in the activation carbons of Samples A to K was measured in the following procedures a), b) and c). The amount of the functional group was measured utilizing the principle that a neutralization reaction occurs between each of three kinds of acidic functional groups, a carboxyl group, a lactone group and a phenolic hydroxyl group, and sodium hydroxide, and the amount of the surface functional group was calculated from the amount of sodium hydroxide consumed in the neutralization reaction.

a) Pre-Treatment

Each of the activated carbons of Samples A to K to be measured was placed in a crucible, and dried in an electric furnace at 300° C. for 3 hours. Each of the samples was cooled to room temperature in a desiccator. Each sample thus treated was used as a measurement sample.

b) Reaction of Carboxyl Group, Lactone Group and Hydroxyl Group 0.1 g of each measurement sample and 50 ml of 0.1M NaOH aqueous solution were placed in a flask, and the flask was applied on a shaker for 2 days. The resulting mixture was then filtered, and the filtrate thus obtained was used as a measurement solution.

c) Quantitative Determination of Acidic Surface Functional Group 20 ml of the measurement solution was sampled, and subjected to back titration with 0.1M HCl aqueous solution. The amount (mmol/g) of a surface functional group was calculated from volume difference to a blank test. The results are shown in Table 5 above.

Measurement of Properties of Activated Carbon:

Specific surface area and average particle size of activated carbons of Samples A to K were measured as follows.

a) Measurement of Specific Surface Area

Specific surface area of the activated carbons of Samples A to K was measured using a nitrogen adsorption method.

Specifically, the average particle size of 1.0 g of each measurement sample of Samples A to K having been subjected to the pre-treatment of the above was measured with a laser diffraction scattering particle size distribution measuring device (SK Laser Micron Sizer LMS-2000e, manufactured by Seishin Enterprise Co., Ltd.). The results are shown in Table 5 above.

Calculation of Amount of Acidic Surface Functional Group Per Unit Area of Activated Carbon:

The amount of a surface functional group per unit area of activated carbon was calculated from the measurement results of the amount of an acidic surface functional group per 1 g of activated carbon obtained above and the specific surface area per 1 g of each of activated carbons A to K obtained by the above measurement method of a specific surface area. The results are shown in Table 5 above.

Preparation of Hybrid Negative Plate:

Using each activated carbon of eleven Samples A to K, a hybrid negative plate for a lead-acid storage battery was prepared in the following manner.

0.5 part by weight of an acetylene black powder as a conductive carbon material and 0.75 part by weight (1.5 times the amount of the acetylene black powder) of a barium sulfate powder were added to 100 parts by weight of a negative electrode active material comprising a lead powder comprising lead monoxide produced by a ball mill method as a main component, followed by mixing. Lignin in an amount of 0.2% by weight based on the weight of the negative electrode active material, 3 g of water, and ion-exchanged water in an amount of 10% by weight based on the weight of the negative electrode active material were added to the mixture obtained above, followed by kneading. Diluted sulfuric acid having specific gravity of 1.36 in an amount of 9.5 parts by weight relative to 100 parts by weight of the negative electrode active material was further added to the resulting mixture, followed by kneading. Thus, a negative electrode active material paste having cap density of about 135 g/2 $in^3$ was prepared. The negative electrode active material paste thus prepared was filled in a collecting grid substrate comprising Pb—Ca alloy, followed by aging in the atmosphere of 40° C. and 95% humidity for 24 hours, and then drying. Thus, a plurality of unformed negative plates was produced.

40 parts by weight of each of eleven kinds of activated carbons different from Samples A to K were added to the formulation composition of a carbon mixture paste shown in Table 6 below to prepare eleven kinds of carbon mixture pastes. Each carbon mixture paste was applied to the entire both surfaces of the negative plate excluding lug in an amount of 8% by weight based on the weight of the active material contained in the negative plate in terms of dry weight when the carbon mixture paste was dried, in a thickness of 0.2 mm. The resulting coating film was dried in air at 60° C. for 1 hour, and at the same time, a lead active material was oxidized. Thus, eleven kinds of hybrid negative plates having formed on the surface of each negative plate a porous carbon mixture coating layer having a porosity of 75% were prepared.

TABLE 6

| Materials | Mixed Amount (parts by weight) |
|---|---|
| Conductive carbon material: Furnace black | 45 |
| Various activated carbons | 40 |
| Binder: Polychloroprene | 10 |
| Thickener: CMC | 4 |
| Short fiber-like reinforcement: Tetron | 5 |
| Dispersion medium: Ion-exchanged water | 280 |

Preparation of Positive Plate:

10 parts by weight of ion-exchanged water and 10 parts by weight of diluted sulfuric acid having specific gravity of 1.27 were added to 100 parts by weight of lead oxide, followed by kneading, to prepare a paste for a positive electrode. The paste for a positive electrode was filled in a collecting grid substrate comprising Pb—Ca alloy, and aged in the atmosphere of 40° C. and 95% humidity for 24 hours, followed by drying. Thus, a plurality of unformed positive plates was prepared.

Production of Lead-Acid Storage Battery:

Five hybrid negative plates and four positive plates prepared above were alternately laminated on each of eleven kinds of the hybrid negative plates prepared above though fine glass mat separators. Lugs of the same polar plates were welded by COS system. Thus, a plate group was assembled. The plate group was placed in a battery case made of polypropylene in the same manner as in the conventional assembling method of a valve-regulated lead-acid storage battery. The battery case was lidded by heat sealing to seal an opening. Thus, eleven kinds of 2V valve-regulated lead-acid storage batteries A to K having 5-hour rate capacity of 10 Ah in capacity control of positive electrode were assembled. In the insertion of the group, degree of compression of the plate group was adjusted by inserting a spacer between the battery case and the plate group as to be 50 kPa. Sulfuric acid aqueous solution having specific gravity of 1.30 prepared by dissolving 30 g/liter of aluminum sulfate octadeca hydrate in water was poured as an electrolyte in each of the lead-acid storage batteries assembled above. Those batteries were charged at 1 A for 20 hours, and then discharged at 2 A until cell voltage becomes 1.75V. The batteries were again charged at 1 A for 15 hours and then discharged at 2 A until a cell voltage of 1.75V. Thus, eleven kinds of lead-acid storage batteries (cells) A to K having 5-hour rate capacity of 10 Ah were produced.

Cycle Life Test:

Each of the lead-acid storage batteries (cells) A to K comprising each of the eleven kinds of the hybrid negative plates was subjected to the following cycle life test by repeating rapid charge and discharge in PSOC in the form of the simulation of running by HEV. Specifically, the test is as follows. Each cell was discharged at 2 A for 1 hour to make PSOC of 80%. Discharging at 50 A for 1 second and charging at 20 A for 1 second were repeated 500 times in the atmosphere of 40° C., and charging at 30 A for 1 second and pausing for 1 second were then repeated 510 times. Those operations were taken as one cycle. This cycle test was repeated, and when discharge voltage of 2V cell reached 0V, it was considered as the end of its life. The results of rapid charge and discharge cycle life test of each of the lead-acid storage batteries are shown in Table 3.

TABLE 7

| Kind of activated carbon | Kind of battery | Cycle Life (number) | Amount of acidic functional group per unit area (µmol/m$^2$) |
|---|---|---|---|
| Sample A | Battery A | 350 | 0.143 |
| Sample B | Battery B | 810 | 0.313 |
| Sample C | Battery C | 1380 | 0.466 |
| Sample D | Battery D | 1810 | 0.578 |
| Sample E | Battery E | 2200 | 1.174 |
| Sample F | Battery F | 2010 | 1.927 |
| Sample G | Battery G | 1010 | 2.845 |
| Sample H | Battery H | 150 | 3.296 |
| Sample I | Battery I | 50 | 4.801 |
| Sample J | Battery J | 160 | 0.080 |
| Sample K | Battery K | 140 | 0.054 |

As is apparent from Table 5 and Table 7 above, great change in specific surface area by a surface oxidation treatment is not observed, and change in an average particle size is not substantially observed. It is therefore seen from this fact that the amount of an acidic surface functional group of an activated carbon greatly affects cycle life of a lead-acid storage battery comprising the hybrid negative plate. To compare the amount of an acidic surface functional group of each sample in "per unit area", a value (µmol/m$^2$) obtained by dividing the amount (mmol/g) of an acidic functional group by a specific surface area (m$^2$/g) was calculated, and the relationship between the value and cycle life of the lead-acid storage batteries A to K each comprising the hybrid negative plate is shown in FIG. 1. Each plot in FIG. 1 indicates cycle life of each of the lead-acid storage batteries A to K comprising each of Samples A to K. The lead-acid storage battery comprising Sample E having been subjected to solution oxidation could obtain life performance of about 6 times the life performance of the lead-acid storage battery A comprising Sample A which has not been subjected to surface treatment.

As a result of obtaining polynomial approximation of plots excluding data of Sample I having values greatly deviated from the plots of Samples A to K shown in FIG. 1, the following mathematical formulae were obtained.

$$y = -843.06x^2 + 2754.6x + 91.458$$

$$R^2 = 0.9415$$

wherein x is an amount of an acidic surface functional group, y is cycle life and $R^2$ is coefficient of determination.

The life of the lead-acid storage battery A is 350 cycles. When 500 cycles that are about 1.5 times the 350 cycles is used as a standard of superiority of cycle life and 500 is substituted for y of the above mathematical formulae, the solution obtained is x=0.16 and 3.11. That is to say, when the amount of an acidic surface functional group is 0.16 to 3.11 $\mu mol/m^2$, the lead-acid storage batteries B to G comprising hybrid negative plates using the activated carbons A to G improve the life to 500 cycles or more.

In the lead-acid storage battery A, the lead-acid batteries B to G, and the lead-acid storage batteries J and K, in which the amount of an acidic surface functional group per unit area is 0.08 to 1.17 $\mu mol/m^2$, a positive linear relation is established. The reason for this is considered that capacitor capacity is increased in proportion to increase in the amount of a functional group. Charge acceptability of a lead-acid storage battery is improved with increasing capacitor capacity, and this leads to the result of long life.

On the other hand, while capacitor capacity is increased as the amount of an acidic surface functional group per unit area is increased, reduction amount of an electrolyte is increased. Generally, in the cycle life test by repeating rapid charge and discharge in PSOC, a battery comes to the end of its life by deterioration (sulfation) of a negative plate, but when the amount of a functional group is 1.93 $\mu mol/m^2$ or more, the battery came to the end of its life by electrolyte leakage. Therefore, from the standpoint of capacitor capacity, the larger the amount of a surface functional group of activated carbon, the better. However, from the standpoint of battery life, it was found that too large amount of a surface functional group has an adverse effect to the battery life.

Comparative Test Example 5

To specifically examine as to what kind of an acidic surface functional group affects the life, activated carbons of Samples L to Q shown in Table 8 below were prepared.

Using those Samples, the amount of a surface functional group was quantitatively determined, and properties (specific surface area and average particle size) were measured.
Quantitative Determination of Amount of Each Acidic Surface Functional Group of Activated Carbon:

Phenol resin-based activated carbon having been subjected to alkali activation for 1 hour was used as Sample L, coconut shell activated carbons having been subjected to steam activation for 2 hours were used as Samples M to P, and wood activated carbon having been subjected to phosphoric acid activation for 2 hours was used as Sample Q. The amount of each acidic surface functional group of each activated carbon of Samples L to Q was quantitatively determined by the conventional method as described in paragraph 0014 of JP-A 2004-47613. Specifically, 2 g of each activated carbon sample was placed in a 100 ml Erlenmeyer flask, 50 ml of each of N/10 alkali reagents ((a) sodium hydrogen carbonate, (b) sodium carbonate, (c) sodium hydroxide, and (d) sodium ethoxide) was added to the flask, followed by shaking for 24 hours and then filtering. Unreacted alkali reagent was titrated with N/10 hydrochloric acid. Carboxyl group reacts with all of the alkali reagents (a) to (d), lactone group reacts with the alkali reagents (b) to (d), and phenolic hydroxyl group reacts with the alkali reagents (c) and (d). Therefore, the amount of each acidic surface functional group was quantitatively determined by deduction of each titration amount. The results are shown in Table 8.

Measurement of Properties of Activated Carbon:

Specific surface area and average particle size of the activated carbons of Samples L to Q were measured in the same manners as in Comparative Test Example 3. The results are shown in Table 8.

Measurement of Amount of Each Acidic Surface Functional Group Per Unit Area of Activated Carbon:

From the measurement results of the amount of a functional group per 1 g of activated carbon obtained above and the specific surface area per 1 g of activated carbon obtained above, the amount of carboxyl group, the amount of lactone group and the amount of phenolic hydroxyl group, per unit area of activated carbon were calculated. The total of carboxyl group, lactone group and phenolic hydroxyl group was considered as the total acid group. The results are shown in Table 8.

TABLE 8

| Kind of activated carbon | Kind of battery | Amount of surface functional group (mmol/g) | | | Total of the acid group | Specific surface area ($m^2/g$) | Average particle size ($\mu m$) |
| --- | --- | --- | --- | --- | --- | --- | --- |
| | | Carboxyl group | Lactone group | Phenolic hydroxyl group | | | |
| Sample L | Battery L | 0.067 | 0.171 | 0.386 | 0.624 | 2214 | 11.1 |
| Sample M | Battery M | 0.045 | 0.113 | 0.228 | 0.386 | 1662 | 13.1 |
| Sample N | Battery N | 0.158 | 0.225 | 0.372 | 0.756 | 1606 | 3.7 |
| Sample O | Battery O | 0.020 | 0.084 | 0.217 | 0.321 | 1527 | 6.0 |
| Sample P | Battery P | 0.039 | 0.067 | 0.280 | 0.385 | 1357 | 9.1 |
| Sample Q | Battery Q | 0.104 | 0.152 | 0.509 | 0.765 | 1564 | 10.7 |

Preparation of Lead-Acid Storage Battery:

Valve-regulated lead-acid storage batteries, that is, storage batteries L to Q shown in Table 9 below, comprising 2V cells having 5-hour rate capacity of 10 Ah were assembled in the same manner as in Comparative Test Example 4, except that activated carbon as a sample differs, followed by preparation of an electrolyte, formation and capacity measurement. Thus, finished batteries were obtained.

TABLE 9

| Kind of activated carbon | Kind of battery | Amount of functional group per unit area (μmol/m²) | | | | Cycle Life (number) |
|---|---|---|---|---|---|---|
| | | Carboxyl group | Lactone group | Phenolic hydroxyl group | Total of the acid group | |
| Sample L | Battery L | 0.030 | 0.077 | 0.174 | 0.282 | 1200 |
| Sample M | Battery M | 0.027 | 0.068 | 0.137 | 0.232 | 870 |
| Sample N | Battery N | 0.099 | 0.140 | 0.232 | 0.470 | 1650 |
| Sample O | Battery O | 0.013 | 0.055 | 0.142 | 0.210 | 750 |
| Sample P | Battery P | 0.028 | 0.049 | 0.206 | 0.284 | 850 |
| Sample Q | Battery Q | 0.066 | 0.097 | 0.326 | 0.489 | 1440 |

Cycle Life Test:

Cycle life test was conducted under the same conditions as in Comparative Test Example 4, except that activated carbon as a sample differs. The results are shown in Table 9 above.

Figure 2:
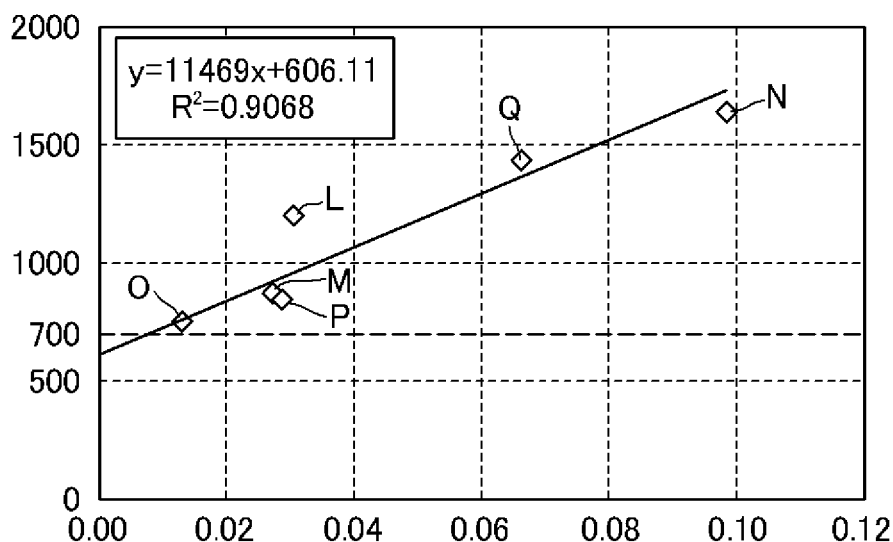
FIG. 2 is a view showing the relationship between an amount of a carboxyl group per unit area of activated carbon and cycle life.

To compare the amount of a surface functional group of each sample in "per unit area", a value (μmol/m²) obtained by dividing the amount (mmol/g) of each functional group by a specific surface area (m²/g) was calculated, and the relationship between the value and cycle life of the lead-acid storage batteries each comprising the hybrid negative plate was examined. In the relationship between the amount of carboxyl group and cycle life, as a result of obtaining linear approximation from each plot as shown in FIG. 2, the following mathematic formulae were obtained.

$$y=11469x+606.11$$

$$R^2=0.9068$$

wherein x is an amount of carboxyl group, y is cycle life, and $R^2$ is coefficient of determination.

The life of the storage battery A in Table 7 is 350 cycles. When 700 cycles that are 2 times the 350 cycles is used as a standard of superiority of life cycle and 700 is substituted for y in the above mathematical formulae, the solution obtained is x=0.01. That is to say, when the amount of carboxyl group is 0.01 μmol/m² or more, the lead-acid storage battery comprising the hybrid negative plate can improve the cycle life.

Figure 3:
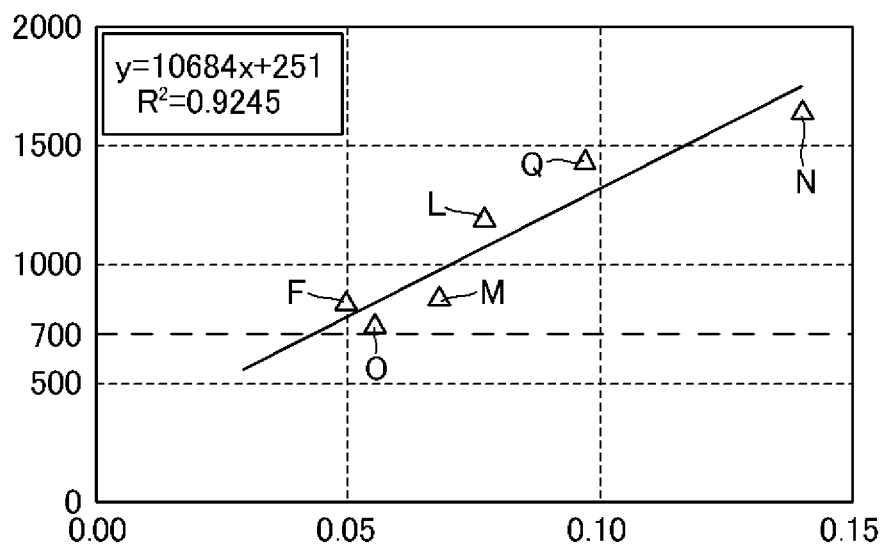
FIG. 3 is a view showing the relationship between an amount of a lactone group per unit area of activated carbon and cycle life.

In the relationship between the amount of lactone group and cycle life, as a result of obtaining linear approximation from each plot as shown in FIG. 3, the following mathematic formulae were obtained.

$$y=10684x+251$$

$$R^2=0.9245$$

wherein x is an amount of lactone group, y is cycle life, and $R^2$ is coefficient of determination.

Similar to the above, when 700 cycles is used as a standard of superiority of life cycle and 700 is substituted for y in the above mathematical formulae, the solution obtained is x=0.04. That is to say, when the amount of lactone group is 0.04 μmol/m² or more, the lead-acid storage battery comprising the hybrid negative plate can improve the cycle life.

Figure 4:
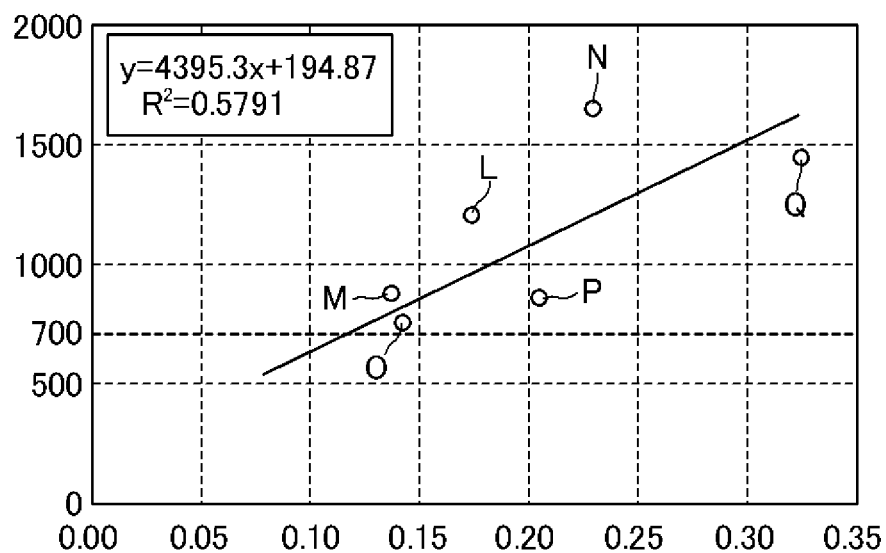
FIG. 4 is a view showing the relationship between an amount of a phenolic hydroxyl group per unit area of activated carbon and cycle life.

In the relationship between the amount of phenolic hydroxyl group and cycle life, as a result of obtaining linear approximation from each plot as shown in FIG. 4, the following mathematic formulae were obtained.

$$y=4395.3x+194.87$$

$$R^2=0.5791$$

wherein x is an amount of phenolic hydroxyl group, y is cycle life, and $R^2$ is coefficient of determination.

Similar to the above, when 700 cycles are used as a standard of superiority of life cycle and 700 is substituted for y in the above mathematical formulae, the solution obtained is x=0.11. That is to say, when the amount of phenolic hydroxyl group is 0.14 μmol/m² or more, the lead-acid storage battery comprising the hybrid negative plate can improve the cycle life.

When the relationship between an amount of each functional group and cycle life is examined, it is apparent from FIGS. 2 to 4 that cycle life of a lead-acid storage battery is improved when the amount of carboxyl group is 0.01 μmol/m² or more, the amount of lactone group is 0.04 μmol/m² or more and the amount of phenolic hydroxyl group is 0.14 μmol/m² or more, respectively. It was further seen that the amount of basic quinone group does not substantially have the effect. It was seen from those facts that activated carbon having an acidic functional group such as carboxyl group, lactone group or phenolic hydroxyl group as a surface functional group can expect to improve cycle characteristics, and the respective functional groups have large effect in the descending order of carboxyl group, lactone group and phenolic hydroxyl group.

As is apparent from Comparative Test Examples 4 and 5, a lead-acid storage battery comprising a hybrid negative plate comprising a negative plate comprising a lead active material-filled plate and a carbon mixture coating layer comprising activated carbon modified with a specific acidic surface functional group, formed on the surface of the negative plate has long cycle life and excellent rapid discharge cycle characteristics in PSOC, and is therefore extremely useful for use in industrial fields utilizing a battery, such as hybrid automobiles repeating on-off operations of an engine, and windmills.

DESCRIPTION OF REFERENCE NUMERALS AND SIGNS

A, B, C, D, E, F, G, H, I, J and K: Plot of each sample

L, M, N, O, P and Q: Plot of each sample

The invention claimed is:

1. A hybrid negative plate for a lead-acid storage battery, comprising a negative electrode active material-filled plate having formed on the surface thereof a coating layer of a carbon mixture comprising a carbon material for ensuring conductivity, an activated carbon for ensuring capacitor capacity and/or pseudocapacitor capacity, and at least a binder, wherein the activated carbon is modified with an acidic functional group such that a total amount of acidic functional groups is in an amount of 0.16 to 0.489 µmol/m² per 1 g of the activated carbon, being a value obtained by dividing the amount of the acidic surface functional group by a specific surface area of 1 g of the activated carbon.

2. The hybrid negative plate for a lead-acid storage battery according to claim 1, wherein the carbon mixture comprises 5 to 70 parts by weight of the carbon material, 20 to 80 parts by weight of the activated carbon modified with a functional group, 1 to 20 parts by weight of the binder, 0 to 10 parts by weight of a thickener, and 0 to 10 parts by weight of a short fiber-like reinforcement.

3. The hybrid negative plate for a lead-acid storage battery according to claim 1, wherein an amount of the carbon mixture applied to the surface of the negative electrode active material-filled plate is 15 parts by weight or less relative to 100 parts by weight of the negative electrode active material.

4. The hybrid negative plate for a lead-acid storage battery according to claim 1, wherein the carbon mixture coating layer has a porosity of 40 to 90%.

5. The hybrid negative plate for a lead-acid storage battery according to claim 1, wherein the carbon mixture coating layer has a thickness of 0.1 mm or less.

6. A lead-acid storage battery comprising the hybrid negative plate according to claim 1.

7. The hybrid negative plate for a lead-acid storage battery according to claim 1, wherein the acidic functional group comprises at least one group selected from a carboxyl group, a lactone group, and a phenolic hydroxyl group.

* * * * *